United States Patent [19]

Park

[11] Patent Number: 5,365,500
[45] Date of Patent: Nov. 15, 1994

[54] KEY CONTROL METHOD AND CONTROL DEVICE FOR A CASSETTE TAPE RECORDER

[75] Inventor: Sung G. Park, Seoul, Rep. of Korea

[73] Assignee: Goldstar Co., Ltd., Seoul, Rep. of Korea

[21] Appl. No.: 810,167

[22] Filed: Dec. 19, 1991

[30] Foreign Application Priority Data

Dec. 24, 1990 [KR] Rep. of Korea ............... P-90-21604

[51] Int. Cl.⁵ .................................................. H04B 1/20
[52] U.S. Cl. ............................................. 369/2; 369/6;
369/7; 369/11; 369/12; 358/335; 358/906; 358/342; 360/33.1
[58] Field of Search ..................... 369/2, 6, 7, 10, 11, 369/12; 358/335, 906, 342; 360/33.1

[56] References Cited

U.S. PATENT DOCUMENTS 3,646,278  2/1972  Panizzi ..................................... 369/2
4,424,574  1/1984  Enoki ....................................... 369/2
5,007,104  4/1991  Brochu .................................... 369/2

FOREIGN PATENT DOCUMENTS 8103713  6/1981  WIPO ...................................... 369/2

Primary Examiner—Robert J. Pascal
Assistant Examiner—Reginald A. Ratliff
Attorney, Agent, or Firm—Birch, Stewart, Kolasch & Birch

[57] ABSTRACT

A cassette tape recorder including input key means having one or more keys, each key capable of representing a plurality of functions selectable by the user to be performed. The control means provides a control signal in response to at least one of the functions selected by the user and the recorder performs the selected function in response to the control signal. Since each key can represent several functions, it will make the recorder more simple in construction, inexpensive and easy to operate.

11 Claims, 6 Drawing Sheets

KEY CONTROL METHOD AND CONTROL DEVICE FOR A CASSETTE TAPE RECORDER

BACKGROUND OF THE INVENTION

Conventional cassette tape recorders have keys each corresponding to only a single function. For example, the "play" key, when activated, performs the play function only, and the "stop" key, when activated, performs the stop function only.

For this reason, conventional cassette tape recorders require many keys to perform various functions, thus making the system complicated, expensive and difficult to operate.

SUMMARY OF THE INVENTION

The present invention overcomes the problems and disadvantages of the prior art by providing a new cassette tape recorder having one or more keys each key capable of performing one or more functions. A new key control device is provided in the new cassette tape recorder and enables the key to operate Play, Stop, Direction of Play, Rewind, Fast-Forward, Radio on/off, and Radio Preset functions, for example. A similier type of key control device is described in a Korean patent application No. 90-14398.

Additional objects and advantage of the invention will be set forth in part in the description which follows, and in part will be obvious from the description, or may be learned by practice of the invention. The objects and advantages of the invention will be realized and attained by means of the elements and combinations particularly pointed out in the appended claims.

The accompanying drawings, which are incorporated in and constitute a part of this specification, illustrate an embodiment of the present invention and together with the description serves to explain the principles of the invention.

DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

Figure 1:
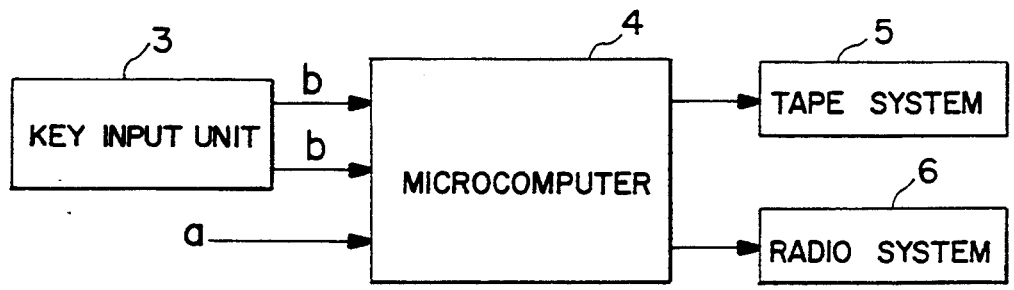
FIG. 1 is a functional block diagram of a key control system of a cassette tape recorder in accordance with an embodiment of the present invention.

FIG. 1 shows a functional block diagram of a key control system of a cassette tape recorder in accordance with an embodiment of the present invention. The key control system includes an input pot A which transmits signals into the main body (not shown) of the recorder when a cassette tape is inserted into the recorder.

A key input unit 3 includes a key 1 relating to performing Play, Stop and Direction functions, and a key 2 relating to performing Rewind, Fast-Forward, Radio on/off and Radio Tuner Pre-set functions. A microcomputer 4 controls the key control system in response to a monitored condition of keys 1 and 2 of key input unit 3 and input pot A, and simultaneously controls a tape system 5 and radio system 6.

Figure 2:
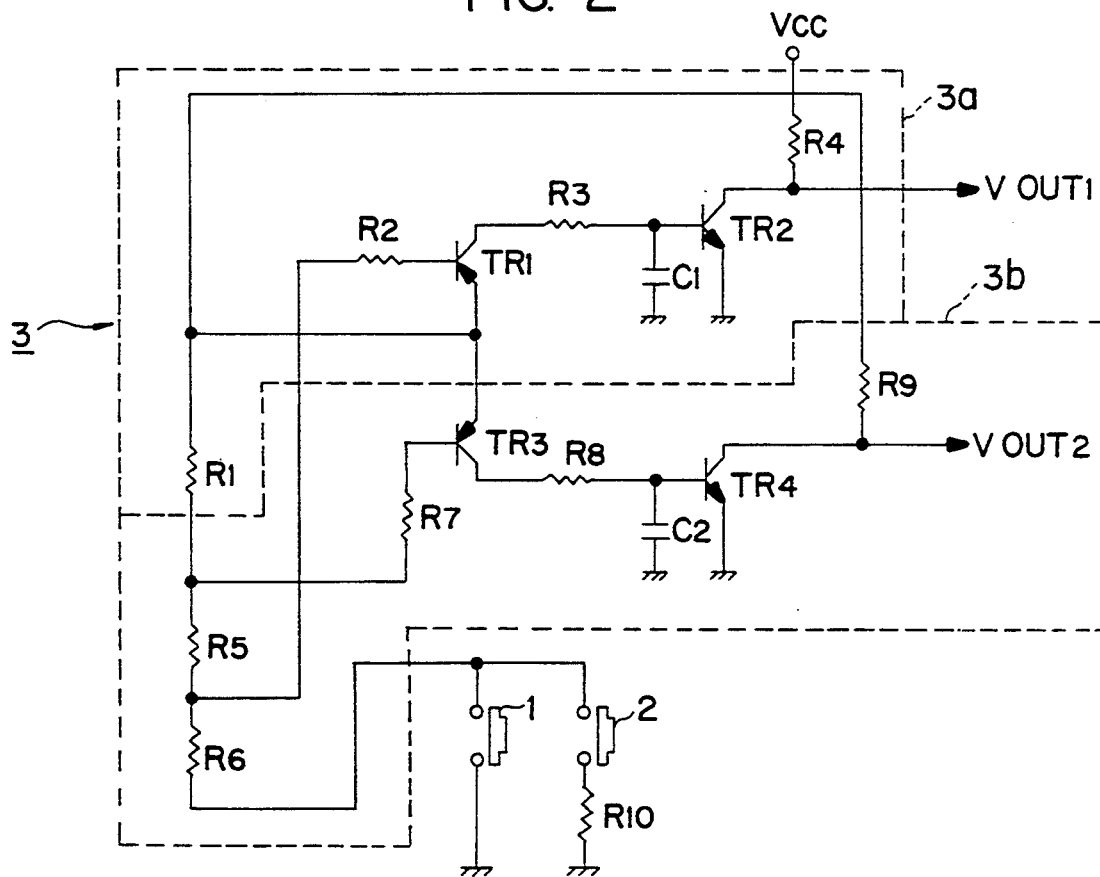
FIG. 2 is a circuit schematic of the key input unit of the key control system of FIG. 1.

FIG. 2 shows a circuit schematic of key input unit 3 of FIG. 1. Key input unit 3 comprises key processing units 3a and 3b. Key processing unit 3a includes transistor TR1 and TR2, capacitor C1, and resistors R1, R2, R3 and R4. Key processing unit 3b includes transistors TR3 and TR4, capacitor C2 and resistors R5, R6, R7, R8 and R9. Key 2 is connected in series with a resistor R10.

When key 1 is pressed, key 1 becomes conductive by a voltage Vcc from a power terminal to process a key signal. Then, key signal processing unit 3a applies the key signal to an output terminal Vout1 which is connected to microcomputer 4. When key 2 is pressed, key 2 becomes conductive by voltage Vcc to process a key signal. Then, key signal processing unit 3b applies the key signal to an output terminal Vout2 which is connected to microcomputer 4.

Figure 3:
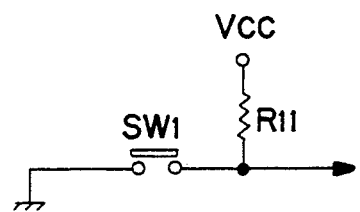
FIG. 3 is a circuit schematic of the key input pot of the key control system of FIG. 1.

FIG. 3 shows a circuit schematic of input pot A of FIG. 1. Input pot A includes a switch SW1 and a resistor R11. When a cassette tape is inserted into the cassette tape recorder, switch SW1 is automatically "turned on" setting input pot A to a tape mode and generating a low-level signal to microcomputer 4. When the tape is not inserted, switch SW1 is "turned off", setting input pot A to a radio mode and generating a high-level signal to microcomputer 4. In other words, when the tape is not inserted, the tape mode is not activated.

During the time the tape remains inserted, the following functions are performed in key input unit 3. When key 1 is pressed, voltage Vcc bypasses to ground, via resistors R1, R5 and R6 of key signal processing units 3a and 3b and key 1. A low-level signal is applied to the base of transistors TR1 and TR3, via resistors R2 and R7, respectively to turn transistors TR1 and TR3 on. This, in turn, causes voltage Vcc to be applied to the base of transistors TR2 and TR4, via transistors TR1 and TR3, and resistors R3 and R8, respectively to turn transistors TR2 and TR4 on.

Voltage Vcc bypasses to ground through a path of resistor R4 and transistor TR2, and through a path of resistor R9 and transistor TR4. At this time, a low-level signal is sent to output terminals Vout1,Vout2 which are connected to an input terminal B of microcomputer 4.

When key 2 is pressed, due to the presence of resistor R10 connected in series with key 2, voltage Vcc, after passing through resistors R1, R5 and R6, is not bypassed to ground. Accordingly, Vcc is divided by resistors R1, R5 and R6, and the divided voltage Vcc turns transistor TR1 off, through resistor R2. The turned off transistor TR1 in turn turns transistor TR2 off, which is connected to transistor TR1 through resistor R3, causing a high-level signal to flow to output terminal Vout1.

Further, when the above divided voltage Vcc is applied to the base of transistor TR3 through resistor R7, a low level signal is applied to the base of transistor TR3 through resistor R7 having infinite resistance. This causes transistors TR3 and TR4 (through resistor R8) to turn on simultaneously. A low-level signal is applied to output terminal Vout2.

Key input unit 3, which is monitored by microcomputer 4, controls tape system 5 and radio system 6 of the recorder in accordance with a monitored condition.

For example, initially when the cassette tape recorder is set to a stop mode, if key 1 is pressed, microcomputer 4 sets the operating mode to a play mode. If key 1 is pressed once while the recorder is set to the play mode, the stop mode is set. If key 1 is pressed twice at a predetermined time interval while the play mode is set, a direction play function is executed.

When the Stop mode is set, if key 2 is pressed once, microcomputer 4 executes a rewind function. If key 2 is pressed twice at a predetermined time interval, a fast-forward function is executed. If key 2 is kept pressed for more than a predetermined time period, radio system 6 of the recorder becomes operative.

Under this state, each time key 2 is kept pressed for the predetermined time period, a tuner pre-set mode of radio system 6 is set. If key 1 is pressed while radio system 6 is operative, Play, Stop, Direction of Play functions are not executed. If key 2 is kept pressed for more than the predetermined time period while radio system 6 is operative, radio system 6 becomes inoperative. If key 1 is pressed when radio system 6 is inoperative, the Play, Stop, Direction of Play functions are executed.

Figure 4:
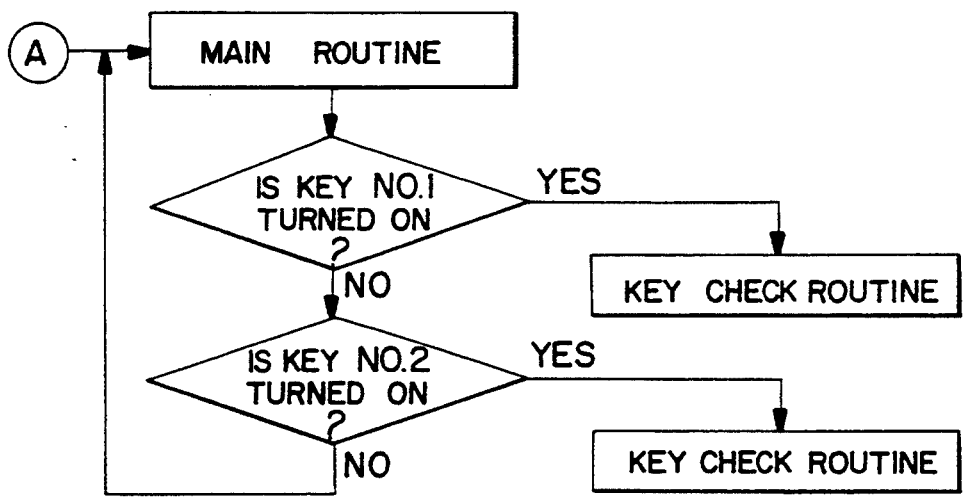
FIG. 4 is a flowchart illustrating a main routine of the operation of the key control system of FIG. 1.

The operation of the key control system is explained in reference to the flowcharts shown in FIG. 4-9 below. FIG. 4 illustrates a flowchart of a main routine. Initially, microcomputer 4 checks whether key 1 or key 2 of key input unit 3 is pressed or turned on. If key 1 or key 2 is turned on, microcomputer 4 executes a key check routine. If keys 1 and 2 are not turned on, microcomputer 4 repeatedly checks the condition of the keys.

Figure 5:
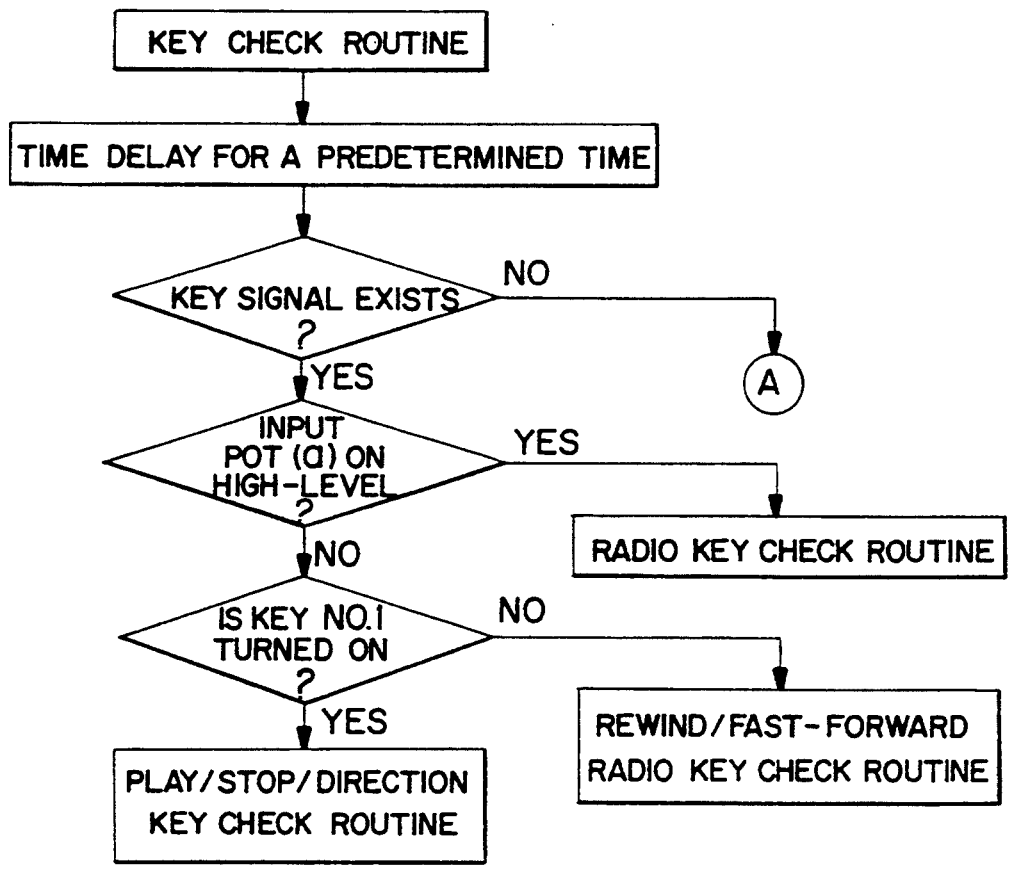
FIG. 5 is a flowchart illustrating a key check routine of the operation of the key control system of FIG. 1.

Referring to FIG. 5, if there is a key signal, microcomputer 4 executes the key check routine. Microcomputer 4 causes a delay for a predetermined time to prevent chattering of the key signal applied from key input unit 3, and then checks the key signal at input pots B of microcomputer 4. If there is no key signal, the main routine shown in FIG. 4 is executed. If there is a key signal, microcomputer 4 will check if the signal from input pot A is the high-level signal which represent the radio mode. If it is the high-level signal, a radio key check routine is executed.

If the input pot A shows the low-level signal which represent the tape mode, microcomputer 4 checks again whether if key 1 is turned on. If key 1 is turned on, a Play/Stop/Direction of play key check routine is executed. If key 1 is not turned on and key 2 is turned on, a Rewind/Fast-Forward/Radio key check routine is executed.

Figure 6:
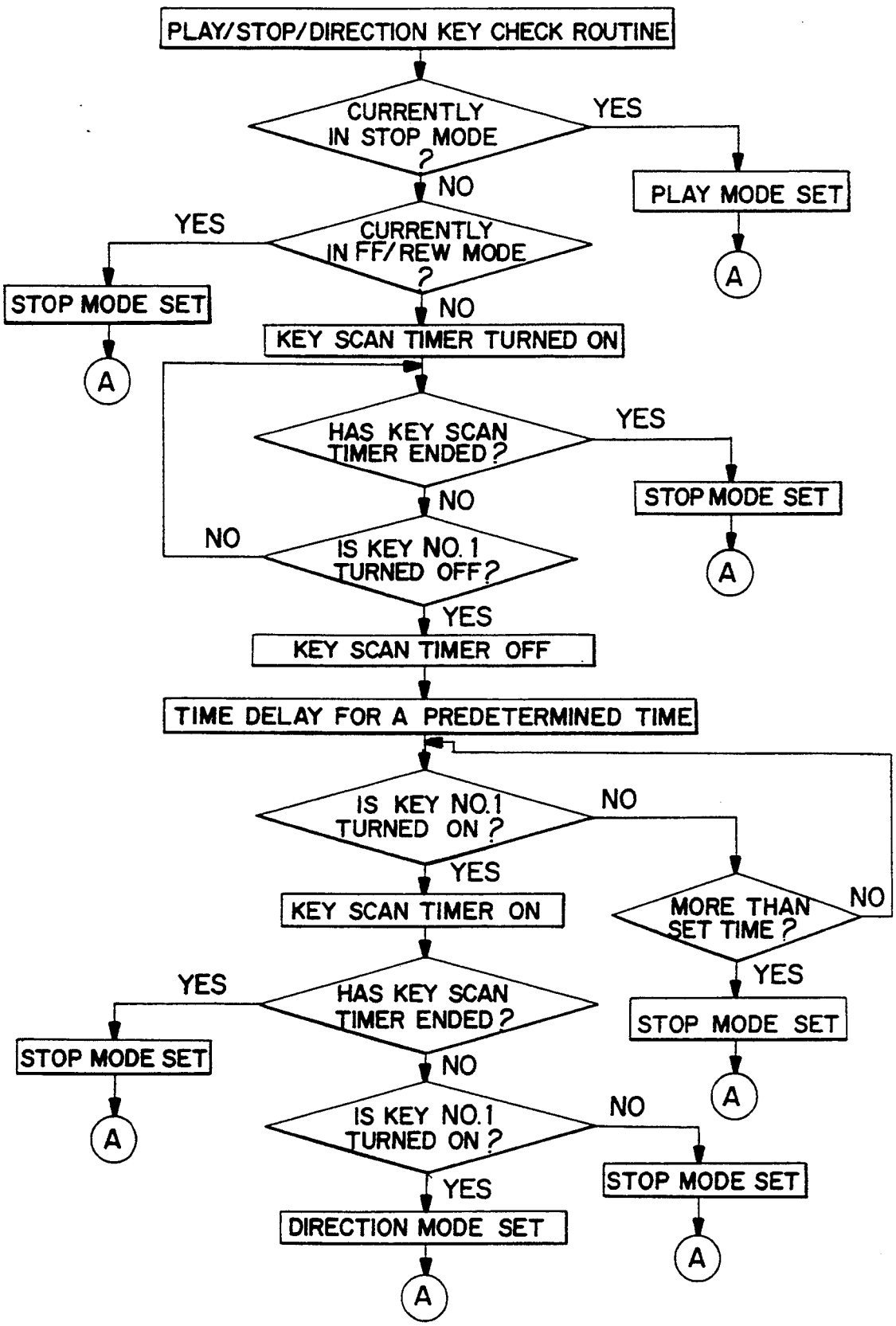
FIG. 6 is a flowchart illustrating a Play/Stop/Direction key check routine of the operation of the key control system of FIG. 1.

Referring to FIG. 6, when the Play/Stop/Direction key check routine shown in FIG. 5 is executed, microcomputer 4 checks whether the recorder is in (i.e., the present set state is) the stop mode. If the present set state is the stop mode, the play mode is set, and the main routine shown in FIG. 4 is executed.

If the present set state is not the stop mode, microcomputer 4 checks whether the present set state is a Rewind/Fast-Forward mode. If the present set state is the Rewind/Fast-Forward mode, the stop mode is set. If the present set state is not, a key scan timer is turned on.

When key 1 is turned on (i.e., key 1 is in the "on" state), it is determined whether the on state is maintained for more than a predetermined time period. If the key scan timer is turned off within the predetermined time period, the stop mode is set.

If key 1 is turned off after key 1 is turned on for more than the predetermined time period, the key scan timer is turned off. Then, the operational process is delayed for a predetermined time period. After that, if key 1 is not turned on within a predetermined time period, the stop mode is set. If key 1 is turned on within the predetermined time period, it is determined whether the on state is maintained for more than a predetermined time period.

If key 1 is turned on for more than the predetermined time period, the present set state is set to a direction mode, and if not, the stop mode is set. Consequently, if key 1 is pressed while the present set state is the stop mode, microcomputer 4 causes to set the play mode. If key 1 is pressed once while the present set state is the play mode, the stop mode is set. If key 1 is pressed twice at a predetermined time interval, the direction play function is executed.

Figure 7:
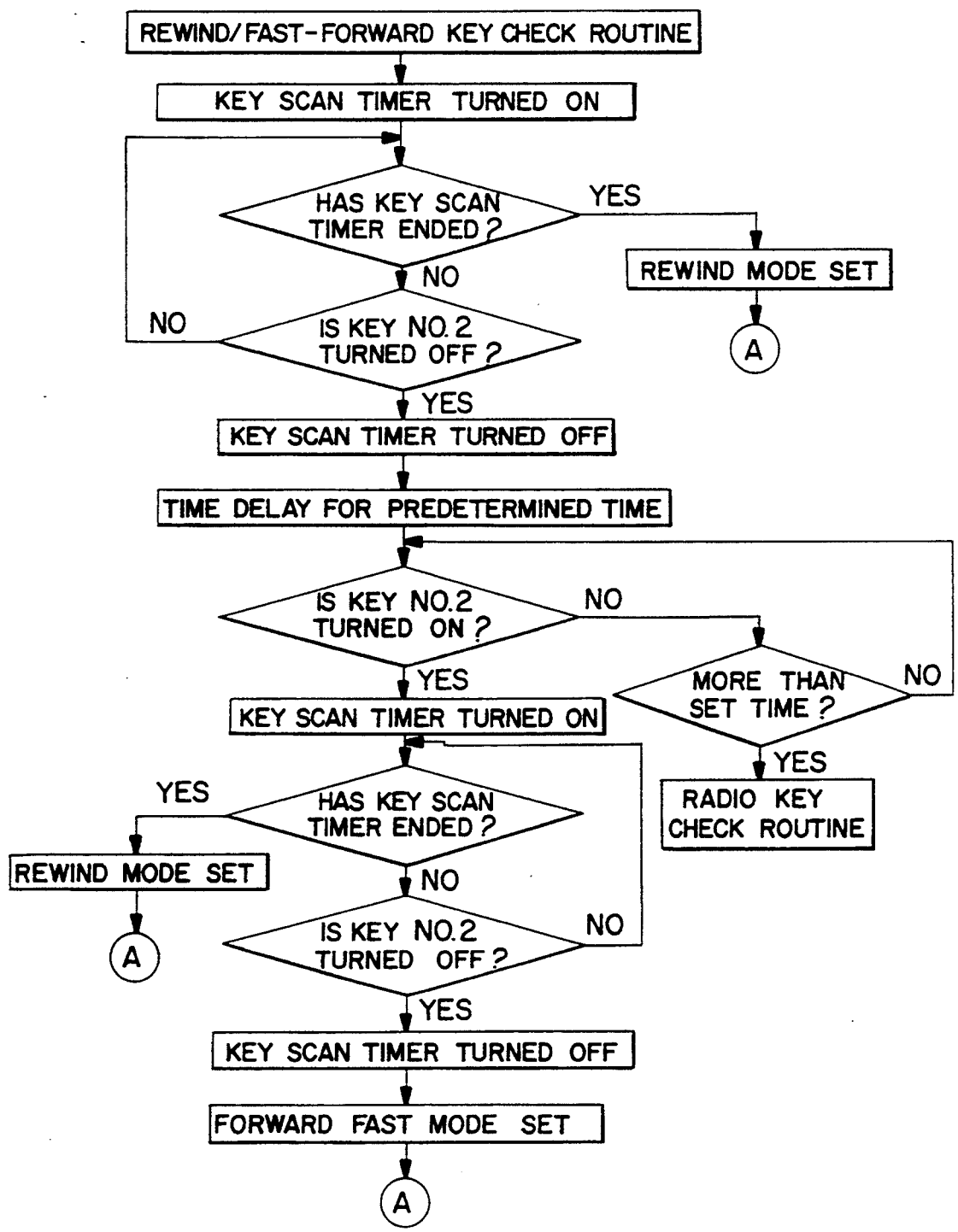
FIG. 7 is a flowchart illustrating a Rewind/Fast Forward key check routine of the operation of the key control system of FIG. 1.

Referring to FIG. 7, when the Rewind/Fast-Forward key check routine shown in FIG. 4 is executed, microcomputer 4 turns on the key scan timer. When the key scan timer is turned on, it is determined whether its turned on state is maintained for more than a predetermined time period.

If key 2 is turned off within the predetermined time period, a rewind mode is set. If key 2 is turned off after the key scan timer is turned on for more than the predetermined time period, the scan timer is turned off.

When key 2 is turned off, the operative process is delayed for a predetermined time period to avoid any malfunction which may be caused by possible chattering noise. After this delay, if key 2 is not turned on within a predetermined time period, the radio key check routine is executed.

If key 2 is turned on within the predetermined time period, it is determined whether its turn on state is maintained for more than a predetermined time period. When key 2 is turned on for more than the predetermined time period, a fast-forward mode is set. Consequently, when key 2 is turned on once when the stop mode is set, the rewind mode is set. If key 2 is turned on twice at a predetermined time interval, the forward-fast mode is set.

Figure 8:
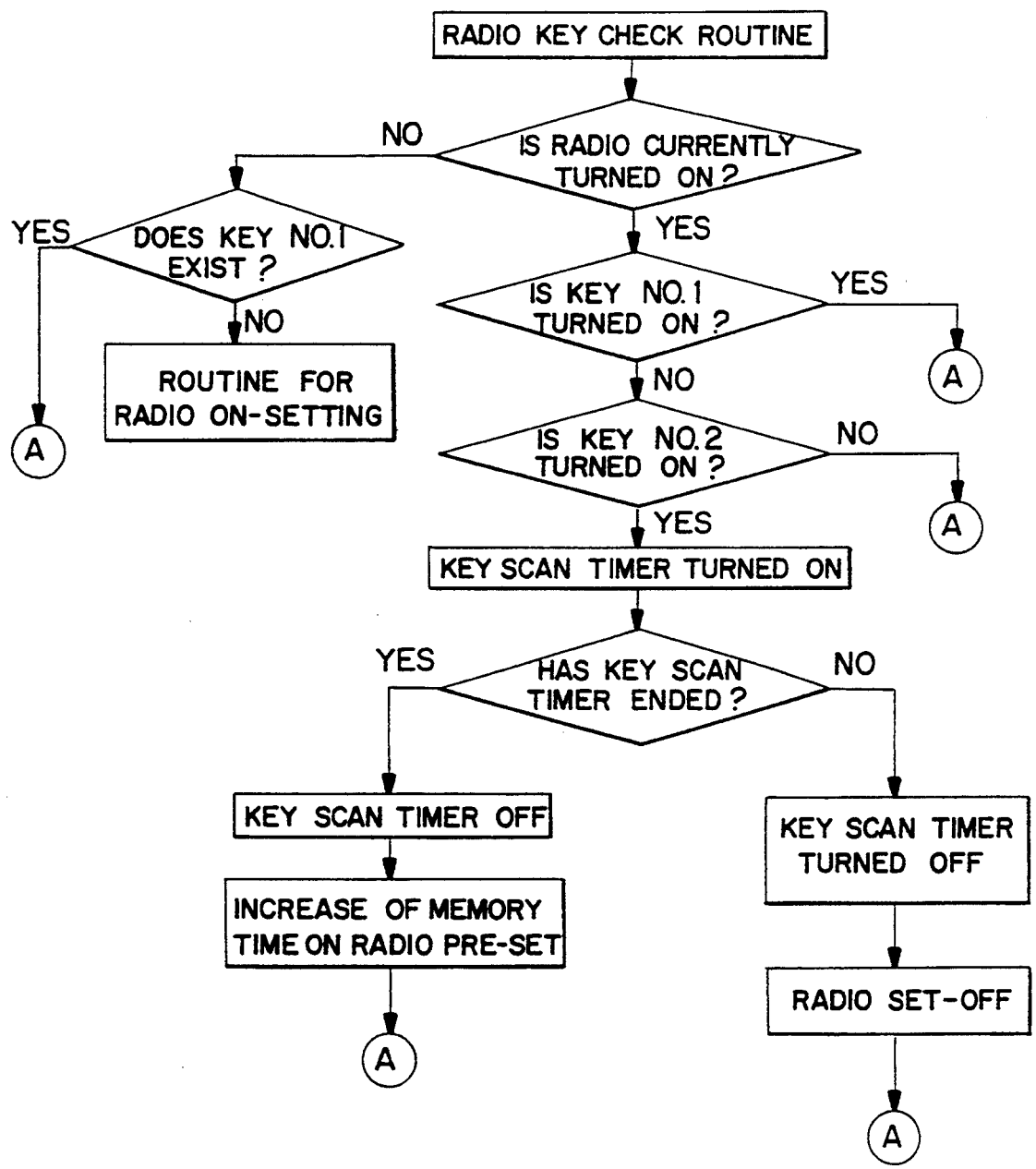
FIG. 8 is a flowchart illustrating a Radio key check routine of the operation of the key control system of FIG. 1.

Referring to FIG. 8, when a radio key check routine is executed, microcomputer 4 checks whether radio system 6 is turned on. If the radio is not turned on, microcomputer 4 checks whether key 1 is turned on. If key 1 is turned on, the main routine shown in FIG. 4 is executed. If key 1 is not turned on, a routine for setting radio system 6 on (i.e., a radio on setting routine) is executed.

When the radio is turned on, microcomputer 1 checks whether key 1 is turned on or off. If key 1 is turned on, Play, Stop, Direction of Play functions are not activated. If key 1 is turned off, key 2 is checked. When key 2 is turned on, the key scan timer is turned on. When key 2 is turned on, it is determined whether its turned on state is maintained for more than a predetermined time period.

If key 2 is turned on for more than the predetermined time period, the key scan timer is turned off, and the radio mode is set off. If key 2 is turned off within the predetermined time period, the key scan timer is turned off, increasing the radio memory time and setting the radio tuner to a pre-set mode.

Figure 9:
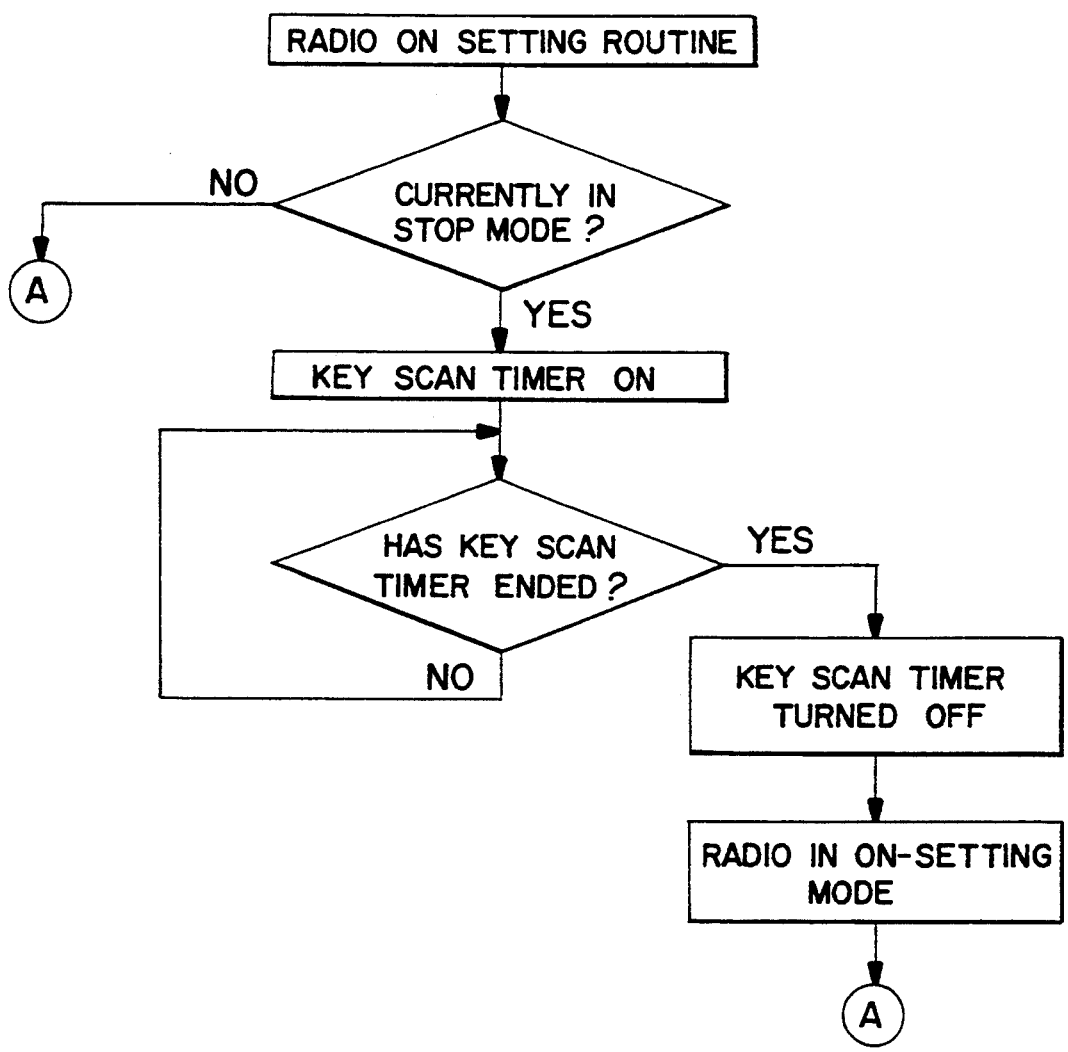
FIG. 9 is a flowchart illustrating a Radio On-setting routine of the operation of the key control system of FIG. 1.

Referring to FIG. 9, in the radio on setting routine, microcomputer 4 checks whether the present set state is the stop mode. If it is not the stop mode, microcomputer 4 executes the main routine shown in FIG. 4. If it is the stop mode, the key scan timer is turned on. If key 2 is turned off within a predetermined time period, a radio "on" mode is set.

FIG. 7 and 8 have been separately prepared for convenience because key 2 simultaneously causes to execute Rewind, Fast-Forward, turning on Radio, and pre-set functions.

As set forth above in the detail, the key control system of the present invention, as embodied herein, includes two keys each executing a plurality of functions, such as Play, Stop, Direction of Play, Rewind, Fast-Forward, Radio on/off, Pre-setting of Radio tuner functions, thereby offering an easy operation of the key system and a simplified circuit structure for the Cassette Tape Recorder.

Other embodiments of the invention will be apparent to the skilled in the art from consideration of the specification and practice of the invention disclosed herein. It is intended that the specification and examples be considered as exemplary only, with a true scope and spirit of the invention being indicated by the following claims.

What is claimed is:

1. A method of controlling operation of a cassette tape recorder with a radio coupled thereto, said cassette tape recorder having one or more keys each representing a plurality of possible functions selectable by the user of the recorder, comprising the steps of:
    manipulating at least one of said one or more keys to represent one of a plurality of possible functions selectable by the user of the recorder to be performed;
    providing a control signal in response to a selected function; and
    performing the selected function in response to said control signal;
    providing a mode signal indicating if one of the recorder and radio was selected by the user; and
    providing an indication that one of the recorder and radio is operative in response to said mode indicating signal.

2. The method of claim 1, wherein said step of manipulating includes the substep of manipulating said key a plurality of times, each time representing a different one of said plurality of functions.

3. A method of controlling operation of a cassette recorder, said recorder includes first and second keys capable of activated to generate key signals representing a plurality of functions selectable by the user to be performed and an input pot generating a mode signal representing an operational mode of the recorder, comprising the steps of:
    determining whether said first second keys are turned on;
    executing a key check routine;
    detecting said key signal from said executed key check routine;
    executing a radio key check routine if said key signal is detected and said input pot generates a high-level signal;
    executing a Play/Stop/Direction key check routine if said first key is activated and the input pot generates a low-level signal; and
    executing a Rewind/Fast-Forward/Radio key check routine if said second key is activated and the input pot generates a low-level signal.

4. The method of claim 3, wherein said step of executing a Rewind/Fast-Forward key check routine includes the substeps of:
    setting a rewind mode if said second key is activated within a first predetermined time period;
    delaying a predetermined time period if said activated state of said second key is maintained for more than a second predetermined time period;
    executing a radio key check routine if said second key is not activated within said first predetermined time period; and
    executing a Fast-Forward mode if said second key is activated again within said second predetermined time period.

5. The method of claim 3, wherein said step of executing a Radio key check routine includes the such steps of:
    executing a radio on-setting routine if said first key is deactivated and the radio is inoperative;
    executing a main routine if said first key is activated and the radio is inoperative;
    executing the main routine when said first key is activated and the radio is activated;
    executing the main routine when said first key is deactivated and said second key is not activated;
    activating a key scan timer when said second key is activated;
    executing a radio off set routine when said key scan timer is activated for more than a predetermined period time; and
    extending a preset memory time of the radio if said key scan times is deactivated within said predetermined period time.

6. The method of claim 5, wherein said step of executing a radio on-setting routine includes the substeps of:
    executing the main routine if a present state the recorder is not a stop mode;
    activating the key scan timer if the present state is the stop mode; and
    activating the radio when said key scan timer is kept activated for a predetermined period time.

7. A cassette tape recorder, comprising:
    a plurality of pressure activated key switches for controlling operations of said cassette tape recorder;
    each of said pressure activated key switches performing a plurality of operating functions dependent on the number of times each key is pressed;
    control means, coupled to said plurality of pressure actuated key switches for providing control signals for said operating functions; and
    means, coupled to said control means, for performing said operating functions in response to said control signals.

8. The cassette tape recorder of claim 7, wherein said pressure activated key switches are operable by user contact.

9. The cassette tape recorder of claim 7, wherein said recorder is coupled to a radio,
  further comprising input pot means for providing a mode signal indicating that one of the recorder and radio was selected by the user; and
  means coupled to said control means for indicating that one of said recorder and radio is operative in response to said mode signal.

10. The cassette tape recorder of switches claim 9, wherein said key of from input key means adaptable to be manipulated by the user of the recorder a plurality of times, each time representing a different one of said plurality of functions selected by the user.

11. The cassette tape recorder of claim 9, wherein said plurality of key switches includes first and second keys and said first key represents play, stop direction of play functions of the recorder and said second key represents rewind, fast-forward functions of the recorder and radio on/off and tuner present functions of the radio.

* * * * *